(12) United States Patent
Ko

(10) Patent No.: US 12,603,712 B2
(45) Date of Patent: Apr. 14, 2026

(54) ANTENNA ADJUSTMENT DEVICE AND METHOD FOR COMMUNICATION SYSTEM

(71) Applicant: Moxa Inc., New Taipei City (TW)

(72) Inventor: Jung-Chieh Ko, New Taipei City (TW)

(73) Assignee: Moxa Inc., New Taipei City (TW)

( * ) Notice: Subject to any disclaimer, the term of this patent is extended or adjusted under 35 U.S.C. 154(b) by 120 days.

(21) Appl. No.: 18/411,001

(22) Filed: Jan. 11, 2024

(65) Prior Publication Data

US 2025/0184014 A1     Jun. 5, 2025

(30) Foreign Application Priority Data

Dec. 5, 2023     (TW) ................................. 112147138

(51) Int. Cl.
*H04B 17/21*          (2015.01)
*H04B 17/12*          (2015.01)

(52) U.S. Cl.
CPC ........... *H04B 17/221* (2023.05); *H04B 17/12* (2015.01)

(58) Field of Classification Search
CPC .... H04B 17/221; H04B 17/12; H04B 1/0458; H04B 1/18; H04B 1/0053
See application file for complete search history.

(56) References Cited

U.S. PATENT DOCUMENTS

| | | |
|---|---|---|
| 2006/0183443 A1 | 8/2006 | Chang |
| 2015/0123870 A1 | 5/2015 | Spears |
| 2015/0200646 A1* | 7/2015 | Peng .................... H04B 1/0458 |
| | | 455/77 |
| 2015/0326254 A1 | 11/2015 | Feldman |
| 2019/0181550 A1* | 6/2019 | Chen ...................... H01Q 21/28 |
| 2020/0014410 A1* | 1/2020 | Greene ................. H04W 24/10 |

FOREIGN PATENT DOCUMENTS

TW          201210190 A1     3/2012

* cited by examiner

*Primary Examiner* — Daniel D Chang
(74) *Attorney, Agent, or Firm* — Winston Hsu

(57)          ABSTRACT
An antenna adjustment device, for a user equipment, wherein the user equipment is coupled to at least one antenna to receive or transmit a wireless signal through the antenna adjustment device, the antenna adjustment device comprising: at least one variable impedance unit, coupled to the at least one antenna; and a micro-controller unit, coupled to the at least one variable impedance unit, for performing the following steps: sending a request signal to the user equipment; receiving a plurality of signal quality parameters responded by the user equipment according to the request signal, wherein the plurality of signal quality parameters are related to the wireless signal; and adjusting a current impedance value of the at least one variable impedance unit according to the plurality of signal quality parameters.

6 Claims, 5 Drawing Sheets

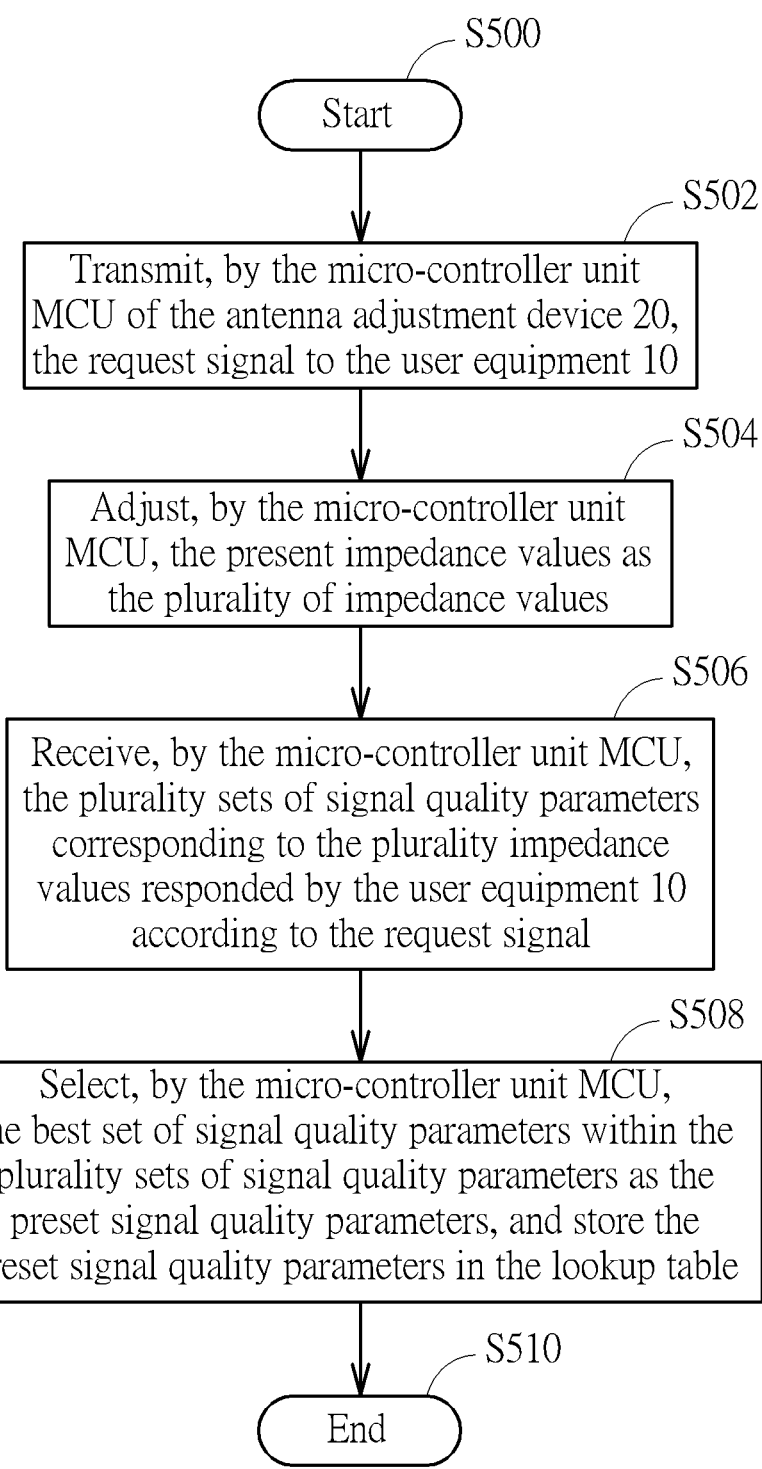

S500

Start

S502

Transmit, by the micro-controller unit
MCU of the antenna adjustment device 20,
the request signal to the user equipment 10

S504

Adjust, by the micro-controller unit
MCU, the present impedance values as
the plurality of impedance values

S506

Receive, by the micro-controller unit MCU,
the plurality sets of signal quality parameters
corresponding to the plurality impedance
values responded by the user equipment 10
according to the request signal

S508

Select, by the micro-controller unit MCU,
the best set of signal quality parameters within the
plurality sets of signal quality parameters as the
preset signal quality parameters, and store the
preset signal quality parameters in the lookup table

S510

End

FIG. 5

ANTENNA ADJUSTMENT DEVICE AND METHOD FOR COMMUNICATION SYSTEM

BACKGROUND OF THE INVENTION

1. Field of the Invention

The present invention relates to an antenna adjustment device and method for a communication system, and more particularly, to an antenna adjustment device and method for dynamically adjusting the antenna connection status according to current signal quality parameters in a communication system.

2. Description of the Prior Art

In the field of communication, the user equipment is designed to ensure that the characteristic impedances between the antenna and the transceiver are consistent before leaving the factory, so as to optimize the performance of wireless signal transmission and reception. However, in many scenarios of industrial wireless communication, the user equipment is usually installed separately from the antenna in a chassis or factory area, and are connected to each other using radio frequency (RF) cables, which may lead to attenuation of the received signals due to inconsistent characteristic impedances between the antenna and the transceiver of the user equipment (for example, using a non-original antenna), affecting signal quality and transmission coverage. Under such circumstances, how to achieve the matching of antennas and the user equipment in industrial wireless communications has become one of the goals of the industry.

SUMMARY OF THE INVENTION

Therefore, the purpose of the present invention is to provide an antenna adjustment device and method for a communication system to improve the drawback of the prior art.

The embodiment of the present invention discloses an antenna adjustment device, for a user equipment, wherein the user equipment is coupled to at least one antenna to receive or transmit a wireless signal through the antenna adjustment device, the antenna adjustment device comprising: at least one variable impedance unit, coupled to the at least one antenna; and a micro-controller unit, coupled to the at least one variable impedance unit, for performing the following steps: sending a request signal to the user equipment; receiving a plurality of signal quality parameters responded by the user equipment according to the request signal, wherein the plurality of signal quality parameters are related to the wireless signal; and adjusting a current impedance value of the at least one variable impedance unit according to the plurality of signal quality parameters.

The embodiment of the present invention discloses an communication system, comprising: at least one antenna; a user equipment; an antenna adjustment device, coupled to the at least one antenna and the user equipment, wherein the user equipment is coupled to the antenna through the antenna adjustment device to transmit or receive a wireless signal, wherein the antenna adjustment device comprises: at least one variable impedance unit, coupled to the at least one antenna; and a micro-controller unit, coupled to the at least one variable impedance unit, for performing the following steps: sending a request signal to the user equipment; receiving a plurality of signal quality parameters responded by the user equipment according to the request signal, wherein the plurality of signal quality parameters are related to the wireless signal; and adjusting a current impedance value of the at least one variable impedance unit according to the plurality of signal quality parameters.

The embodiment of the present invention discloses a method of generating a lookup table, wherein the lookup table is used to store a default signal quality parameter to adjust a current impedance value of at least one variable impedance unit of an antenna adjustment device, the method comprises: sending, by a micro-controller unit of the antenna adjustment device, a request signal to a user equipment; adjusting, by the micro-controller unit, the current impedance value to a plurality of impedance values; receiving, by the micro-controller unit, a plurality of sets of signal quality parameters corresponding to the plurality impedance values responded by the user equipment according to the request signal, wherein the plurality of sets of signal quality parameters are related to a wireless signal received or transmitted by the user equipment coupled to at least one antenna through the antenna adjustment device; and selecting, by the micro-controller unit, a best set of signal quality parameters among the plurality of sets of signal quality parameters as the default signal quality parameters, and storing the default signal quality parameters in the lookup table.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a flow chart of a lookup table generation method according to an embodiment of the present invention.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
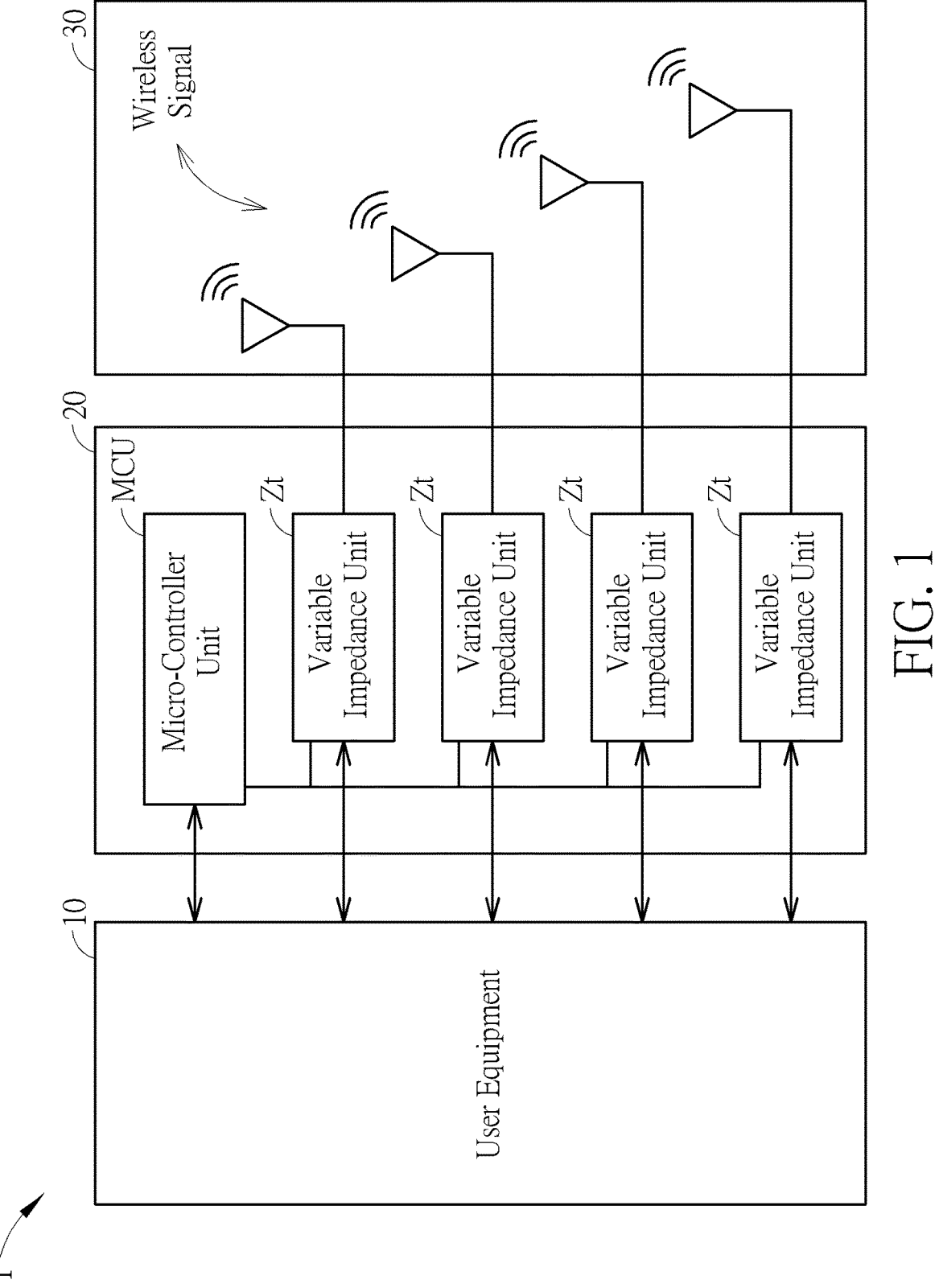
FIG. 1 is a schematic diagram of a communication system according to an embodiment of the present invention.

Please refer to FIG. 1. FIG. 1 is a schematic diagram of a communication system 1 according to an embodiment of the present invention. The communication system 1 includes a user equipment 10, an antenna adjustment device 20 and at least one antenna 30. The user equipment 10 may be coupled to at least one antenna 30 to receive or transmit a wireless signal through the antenna adjustment device 20. When receiving or transmitting the wireless signal, the antenna adjustment device 20 may dynamically adjust the connection status of the at least one antenna 30 and the user equipment 10 to ensure that characteristic impedances between the antenna and the transceiver of the user equipment are consistent, and optimize the performance of wireless signal transmission and reception.

In detail, the antenna adjustment device 20 includes at least one variable impedance unit Zt and a micro-controller unit MCU. The micro-controller unit MCU is coupled to the user equipment 10 and the at least one variable impedance unit Zt, and the at least one variable impedance unit Zt is respectively coupled to the user equipment 10 and the at least one antenna 30. It should be noted that, in FIG. 1, the number of the antennas 30 and the variable impedance units Zt is 4 respectively, that is, the 4 antennas 30 are respectively coupled to the 4 variable impedance units Zt, which are only used to illustrate the operation of the present invention, but are not limited thereto. Those skilled in the art may make appropriate adjustments according to the system requirements.

Figure 2:
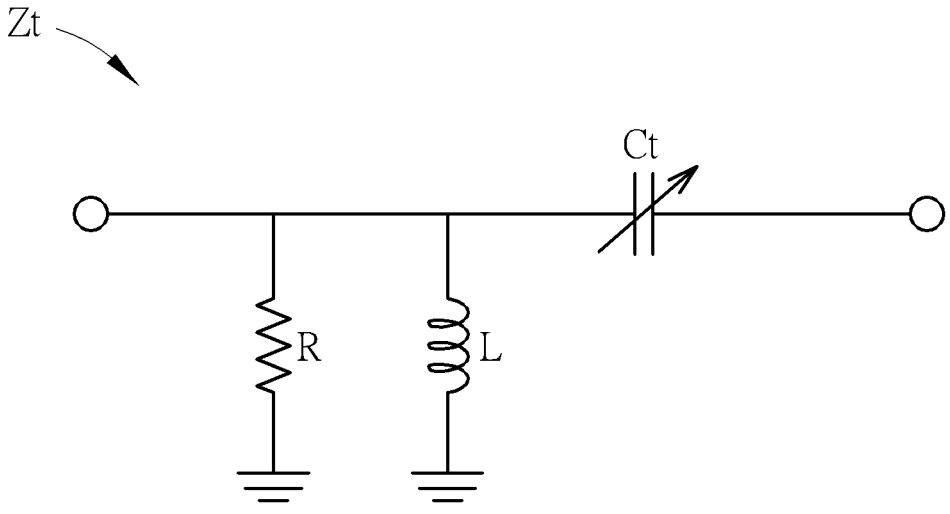
FIG. 2 is a schematic diagram of the variable impedance value according to an embodiment of the present invention.

Furthermore, in an embodiment, as shown in FIG. 2, in order to achieve the consistency of characteristic impedances between the at least one antenna 30 and the user equipment 10, each variable impedance unit among the variable impedance units Zt may include basic components, such as a fixed resistor, a fixed inductor and a variable capacitor Ct, but are not limited thereto. The micro-controller unit MCU may regulate the impedance value of each variable impedance unit by adjusting the variable capacitor Ct. The design principle of the at least one variable impedance unit Zt should be well known in the art, so it is not reiterated here.

Figure 3:
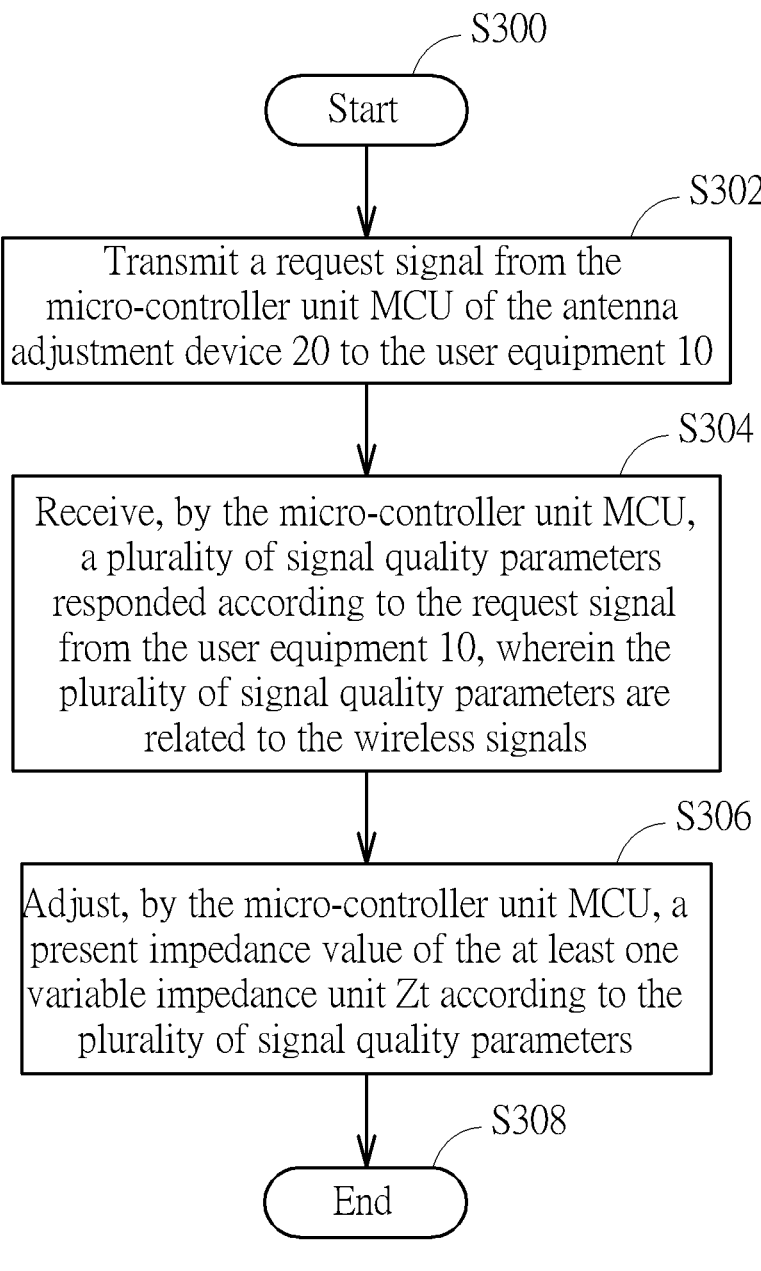
FIG. 3 is a flow chart of an antenna adjustment method according to an embodiment of the present invention.

In order to ensure that the performance of the user equipment 10 when transmitting or receiving the wireless signals is optimized, the antenna adjustment device 20 may adjust the at least one variable impedance unit Zt, to achieve the characteristic impedances between the at least one antenna 30 and the user equipment 10 to be consistent. Specifically, the micro-controller unit MCU may adjust each variable impedance unit Zt simultaneously or separately to ensure the consistency of the characteristic impedances between the each antenna 30 and the user equipment 10, and is not limited thereto. The operations of the micro-controller unit MCU may be summarized as an antenna adjustment method 3, as shown in FIG. 3. The antenna adjustment method 3 includes the following steps:

Step S300: Start.

Step S302: Transmit a request signal from the micro-controller unit MCU of the antenna adjustment device 20 to the user equipment 10.

Step S304: Receive, by the micro-controller unit MCU, a plurality of signal quality parameters responded according to the request signal from the user equipment 10, wherein the plurality of signal quality parameters are related to the wireless signals.

Step S306: Adjust, by the micro-controller unit MCU, a present impedance value of the at least one variable impedance unit Zt according to the plurality of signal quality parameters.

Step S308: End.

According to the antenna adjustment method 3, when the user equipment 10 transmits or receives the wireless signals through the at least one antenna 30, the micro-controller unit MCU of the antenna adjustment device 20 may actively request the user equipment 10 to report the plurality of signal quality parameters related to the present transmitted or received wireless signals (Step S302). After receiving the plurality of signal quality parameters, the micro-controller unit MCU may determine whether the performance of the present wireless signals transmitted or received by the user equipment 10 according to the plurality of signal quality parameters is optimized. If the performance of the present wireless signals is optimized, the micro-controller unit MCU maintains the present impedance values of the at least one variable impedance unit Zt. If the performance of the present wireless signals is not optimized, the micro-controller unit MCU adjusts the at least one variable impedance unit Zt to ensure that the characteristic impedances between the at least one antenna 30 and the user equipment 10 are consistent, so that the performance of the user equipment 10 transmitting and receiving the wireless signals is optimized (Step S306). It should be noted that, the different impedance values of the at least one variable impedance unit Zt represent different connection states between the user equipment 10 and the at least one antenna 30. The performance of transmitting or receiving the wireless signals changes with the different connection states. For example, the micro-controller unit MCU may change the connection states between the user equipment 10 and the at least one antenna 30 to adjust the variable capacitor Ct, and request the user equipment to re-report the plurality of signal quality parameters of the wireless signals transmitted or received through the new connection state. Accordingly, the micro-controller unit MCU determines whether the performance of the user equipment 10 transmitting and receiving the wireless signals has been optimized.

Figure 4:
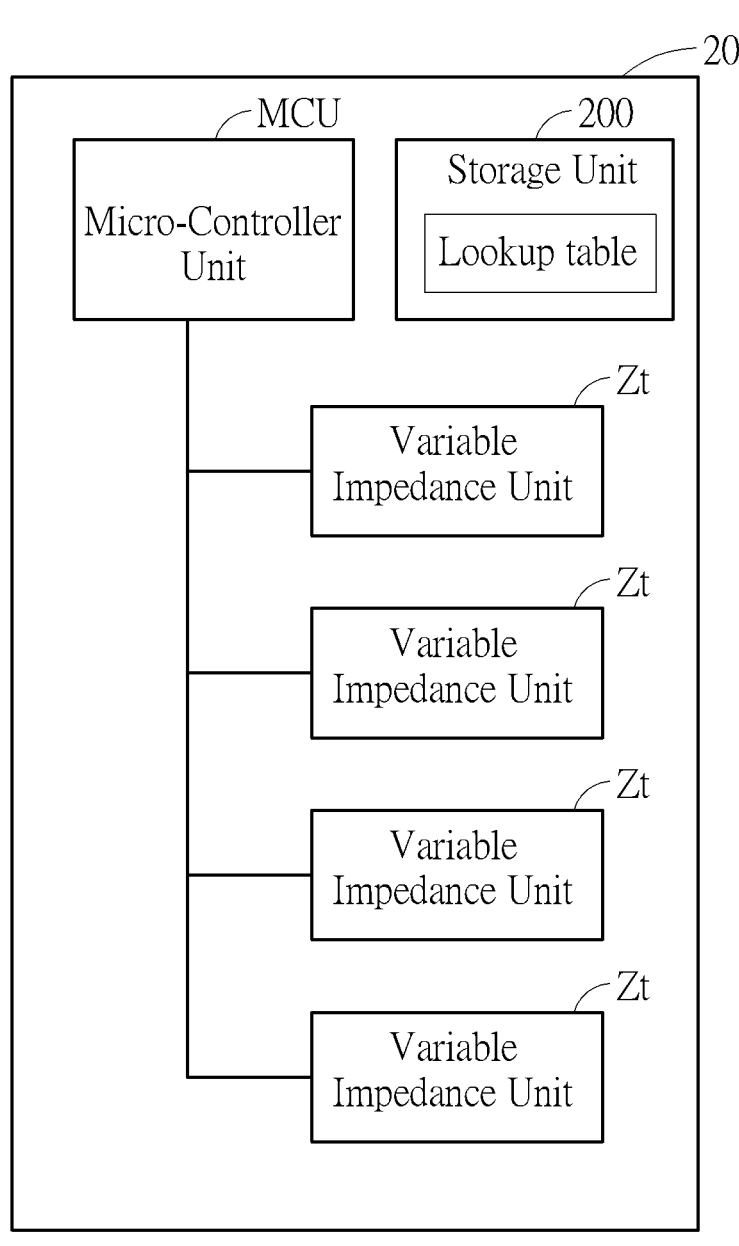
FIG. 4 is a schematic diagram of an antenna adjustment device according to an embodiment of the present invention.

It should be noted that, the antenna adjustment method 3 is the embodiment of the present invention. Those skilled in the art should readily make combinations, modifications and/or alterations on the abovementioned description and examples. For example, in an embodiment, as shown in FIG. 4, the antenna adjustment device 20 may include a storage unit 200. The storage unit 200 stores a lookup table, and the lookup table includes optimized impedance values and a plurality of preset signal quality parameters corresponding to the optimized impedance values. In this way, the micro-controller unit MCU may adjust the present impedance values of the at least one variable impedance unit Zt according to the plurality of signal quality parameters and the lookup table. Specifically, the optimized impedance values and the plurality of preset signal quality parameters corresponding to the optimized impedance values in the lookup table may be the optimized or better impedance values and signal quality parameters related to the communication system in various scenarios where the antenna and the user equipment are set separately. Therefore, by comparing the present plurality of signal quality parameters and the plurality of preset signal quality parameters in the lookup table, the antenna adjustment device 20 may determine whether the performance of the user equipment 10 that transmits and receives the wireless signals at present has been optimized. If the performance is not optimized, the micro-controller unit MCU may adjust the variable capacitor Ct, so that the at least one variable impedance unit Zt is equal to the optimized impedance values in the lookup table. In this way, the characteristic impedances between the user equipment 10 and at least one antenna 30 are consistent (i.e. the user equipment 10 and at least one antenna 30 are in the optimized or better connection state), and the performance of transmitting and receiving the wireless signals is optimized.

In another embodiment, the user equipment 10 may transmit or receive the wireless signals through a plurality of frequency bands, and the lookup table stored in the storage unit 200 may include the plurality of optimized impedance values corresponding to the plurality of frequency bands and a plurality sets of preset signal quality parameters. For example, the user equipment 10 may transmit or receive the wireless signals through band 1-band N, and the lookup table may store N optimized impedance values and N sets of preset signal quality parameters corresponding to band 1-band N. In this way, the micro-controller unit MCU may adjust the present impedance values of the at least one variable impedance unit Zt according to the plurality of signal quality parameters and the lookup table. In detail, when the user equipment 10 transmits or receives the wireless signals through the at least one antenna 30, the micro-controller unit MCU performs the following steps: transmitting the request signal to the user equipment 10, receiving a present frequency band corresponding to the plurality of signal quality parameters responded by the user equipment 10 according to the request signal; querying a set of the preset signal quality parameters corresponding to the present frequency band within the plurality of optimized impedance values in the lookup table; comparing the plurality of signal quality parameters and the set of the preset signal quality parameters corresponding to the present frequency band; when the plurality of signal quality parameters is better than or equal to the preset signal quality parameters corresponding to the present frequency band, maintaining the present impedance values of the at least one variable impedance unit Zt; and when the plurality of signal quality parameters is not better than the set of the preset signal quality parameters corresponding to the present frequency band, adjusting the present impedance values of the at least one variable impedance unit Zt as the optimized impedance values corresponding to the present frequency band within the plurality of optimized impedance values. It should be noted that, the difference from the above-mentioned embodiments is that in addition to actively requesting the user equipment 10 to report the plurality of signal quality parameters, the micro-controller unit MCU also actively requests the user equipment 10 to report the present frequency band for transmitting or receiving the wireless signals. In this way, the micro-controller unit MCU may select the setoff present signal quality parameters corresponding to the present frequency band in the lookup table to compare with the plurality of signal quality parameters, and determine whether the performance of the user equipment 10 transmitting and receiving the wireless signals has been optimized.

It should be noted that, the plurality of signal quality parameters and the plurality sets of signal quality parameters indicate the transmission performance or the transmission quality corresponding to the received or transmitted wireless signals, and the form thereof is not limited. Those skilled in the art may make appropriate adjustments according to the system requirements. For example, the plurality of signal quality parameters and the plurality sets of signal quality parameters may include but are not limited to a transmission power, a receive power, a channel quality indicator (CQI), a received signal strength indication (RSSI) and a reference signal received power (RSRP). The micro-controller unit MCU may utilize one or more of the above signal quality parameters to adjust the at least one variable impedance unit Zt, to ensure that the characteristic impedances between the at least one antenna 30 and the user equipment 10 are consistent. In an embodiment, the present invention chooses to utilize the transmission power as the basis for adjusting the variable impedance values Zt. The micro-controller unit MCU compares the transmission power responded by the user equipment 10 and a present transmission power stored in the lookup table. When the transmission power is better than the present transmission power, the micro-controller unit MCU maintains the present impedance values of the at least one variable impedance unit Zt. Conversely, when the transmission power is not better than the present transmission power, the micro-controller unit MCU adjusts the present impedance values of the at least one variable impedance unit Zt to the optimized impedance values corresponding to the present frequency band within the plurality of optimized impedance values. For example, if the user equipment 10 reports that the transmission power is 19 dbm, and the present transmission power recorded in the lookup table is 17 dbm, the micro-controller unit MCU determines that the transmission power is better than the present transmission power, and maintains the present impedance values of the at least one variable impedance unit Zt. In another embodiment, the present invention utilizes the above 5 signal quality parameters (the transmission power, the receive power, the channel quality indicator, the received signal strength indication and the reference signal received power) as the basis for the adjustment of the variable impedance value Zt, and sets 5 signal quality parameter weights W1-W5 respectively. In this way, the micro-controller unit MCU may adjust the present impedance values of the at least one variable impedance unit Zt according to the plurality of signal quality parameters and the lookup table. The calculation of weigh method should be well known in the art and will not be repeated here.

The above operations of the micro-controller unit MCU to generate the lookup table may be summarized as a lookup table generation method 5, as shown in FIG. 5. The lookup table generation method 5 includes the following steps:

Step S500: Start.

Step S502: Transmit, by the micro-controller unit MCU of the antenna adjustment device 20, the request signal to the user equipment 10.

Step S504: Adjust, by the micro-controller unit MCU, the present impedance values as the plurality of impedance values.

Step S506: Receive, by the micro-controller unit MCU, the plurality sets of signal quality parameters corresponding to the plurality impedance values responded by the user equipment 10 according to the request signal.

Step S508: Select, by the micro-controller unit MCU, the best set of signal quality parameters within the plurality sets of signal quality parameters as the preset signal quality parameters, and store the preset signal quality parameters in the lookup table.

Step S510: End.

It should be noted that, in Step S502 and Step S504, the micro-controller unit MCU adjusts the present impedance values of the at least one variable impedance unit Zt as the plurality of impedance values, and requests the user equipment 10 to report the plurality sets of signal quality parameters corresponding to the plurality of impedance values. In this way, in Step S508, the micro-controller unit MCU may compare the plurality sets of signal quality parameters to select the best set of signal quality parameters as the preset signal quality parameters, and then update and store the preset signal quality parameters in the lookup table. The detailed description and derivative changes of comparing the plurality sets of signal quality parameters in the lookup table generation method 5 are described as above, and will not repeated here.

It should be noted that the communication system 1 is the embodiment of the present invention. Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), a computer on module (CoM) and the computer system. Any of the abovementioned procedures and examples above may be compiled into program codes or instructions that are stored in a storage unit 200. The storage unit 200 may include read-only memory (ROM), flash memory, random access memory (RAM), subscriber identity module (SIM), hard disk, or CD-ROM/DVD-ROM/BD-ROM, but not limited thereto. The MCU 30 may read and execute the program codes or the instructions stored in the storage unit 200 for realizing the abovementioned functions.

In summary, the antenna adjustment device of the present invention for the communication system may dynamically adjust the connection state of the antenna and the user equipment to ensure that the characteristic impedances between the antenna and the user equipment are consistent when the user equipment transmits or receives the wireless signals. In this way, compared with the prior art, the present invention may maintain the optimized wireless signal quality and the maximized transmission coverage in the scene where the antenna and the user equipment are set up separately.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna adjustment device, for a user equipment, wherein the user equipment is coupled to at least one external antenna to receive or transmit a wireless signal through the antenna adjustment device, the antenna adjustment device comprising:

at least one variable impedance unit, coupled to the at least one external antenna;

a micro-controller unit, coupled to the at least one variable impedance unit, for performing the following steps:

sending a request signal to the user equipment;

receiving a plurality of signal quality parameters responded by the user equipment according to the request signal, wherein the plurality of signal quality parameters are related to the wireless signal; and adjusting a current impedance value of the at least one variable impedance unit according to the plurality of signal quality parameters; and a storage unit, stores a lookup table, wherein the lookup table comprises a plurality of optimized impedance values and a plurality of sets of default signal quality parameters corresponding to a plurality of band;

wherein the micro-controller unit adjusts the current impedance value of the at least one variable impedance unit according to the plurality of signal quality parameters and the lookup table;

wherein the step of adjusting the current impedance value of the at least one variable impedance unit according to the plurality of signal quality parameters and the lookup table comprises:

receiving a current band corresponding to the plurality of signal quality parameters responded to by the user equipment according to the request signal;

querying a set of default signal quality parameters corresponding to the current band among the plurality of optimized impedance values in the lookup table;

comparing the plurality of signal quality parameters and the set of default signal quality parameters;

maintaining the at least one variable impedance unit when the plurality of signal quality parameters are better or the same as the set of default signal quality parameters; and adjusting the at least one variable impedance unit to an optimized impedance value corresponding to the current band among the plurality of optimized impedance values when the plurality of signal quality parameters are not better than the set of default signal quality parameters.

2. The antenna adjustment device of claim 1, wherein the plurality of signal quality parameters and the set of default signal quality parameters comprise at least one of a transmission power, a reception power, a channel quality indicator (CQI), a received signal strength indication (RSSI) and a reference signal received power (RSRP).

3. An antenna adjustment method, for an antenna adjustment device, wherein a user equipment is coupled to at least one external antenna to receive or transmit a wireless signal through the antenna adjustment device, the antenna adjustment method comprising:

sending, by a micro-controller unit of the antenna adjustment device, a request signal to the user equipment;

receiving, by the micro-controller unit, a plurality of signal quality parameters responded by the user equipment according to the request signal, wherein the plurality of signal quality parameters are related to the wireless signal; and adjusting, by the micro-controller unit, a current impedance value of the at least one variable impedance unit according to the plurality of signal quality parameters;

wherein the antenna adjustment device stores a lookup table, the lookup table comprises a plurality of optimized impedance values and a plurality of sets of default signal quality parameters corresponding to a plurality of band; wherein the step of adjusting the current impedance value of the at least one variable impedance unit according to the plurality of signal quality parameters is adjusting the current impedance value of the at least one variable impedance unit according to the plurality of signal quality parameters and the lookup table;

wherein the step of adjusting the current impedance value of the at least one variable impedance unit according to the plurality of signal quality parameters and the lookup table comprises:

receiving a current band corresponding to the plurality of signal quality parameters responded to by the user equipment according to the request signal;

querying a set of default signal quality parameters corresponding to the current band among the plurality of optimized impedance values in the lookup table;

comparing the plurality of signal quality parameters and the set of default signal quality parameters;

maintaining the at least one variable impedance unit when the plurality of signal quality parameters are better or the same as the set of default signal quality parameters; and adjusting the at least one variable impedance unit to an optimized impedance value corresponding to the current band among the plurality of optimized impedance values when the plurality of signal quality parameters are not better than the set of default signal quality parameters.

4. The antenna adjustment device of claim 3, wherein the plurality of signal quality parameters and the set of default signal quality parameters comprise at least one of a transmission power, a reception power, a channel quality indicator (CQI), a received signal strength indication (RSSI) and a reference signal received power (RSRP).

5. A communication system, comprising:

at least one antenna;

a user equipment;

an antenna adjustment device, coupled to the at least one antenna and the user equipment, wherein the user equipment is coupled to the antenna through the antenna adjustment device to transmit or receive a wireless signal, wherein the antenna adjustment device comprises:

at least one variable impedance unit, coupled to the at least one antenna; and a micro-controller unit, coupled to the at least one variable impedance unit, for performing the following steps:

sending a request signal to the user equipment;

receiving a plurality of signal quality parameters responded by the user equipment according to the request signal, wherein the plurality of signal quality parameters are related to the wireless signal;

adjusting a current impedance value of the at least one variable impedance unit according to the plurality of signal quality parameters; and a storage unit, stores a lookup table, wherein the lookup table comprises a plurality of optimized impedance values and a plurality of sets of default signal quality parameters corresponding to a plurality of band;

wherein the micro-controller unit adjusts the current impedance value of the at least one variable impedance unit according to the plurality of signal quality parameters and the lookup table;

wherein the step of adjusting the current impedance value of the at least one variable impedance unit according to the plurality of signal quality parameters and the lookup table comprises:

receiving a current band corresponding to the plurality of signal quality parameters responded to by the user equipment according to the request signal;

querying a set of default signal quality parameters corresponding to the current band among the plurality of optimized impedance values in the lookup table;

comparing the plurality of signal quality parameters and the set of default signal quality parameters;

maintaining the at least one variable impedance unit when the plurality of signal quality parameters are better or the same as the set of default signal quality parameters; and adjusting the at least one variable impedance unit to an optimized impedance value corresponding to the current band among the plurality of optimized impedance values when the plurality of signal quality parameters are not better than the set of default signal quality parameters.

6. The communication system of claim 5, wherein the plurality of signal quality parameters and the set of default signal quality parameters comprise at least one of a transmission power, a reception power, a channel quality indicator (CQI), a received signal strength indication (RSSI) and a reference signal received power (RSRP).

* * * * *